(No Model.)

H. TIMKEN & R. HEINZELMAN.
ROLLER BEARING.

No. 606,636. Patented June 28, 1898.

Attest:
C. J. Riley

Inventors:
Henry Timken and
Reginald Heinzelman,
by Carr & Carr, Attys.

UNITED STATES PATENT OFFICE.

HENRY TIMKEN AND REGINALD HEINZELMAN, OF ST. LOUIS, MISSOURI, ASSIGNORS OF ONE-HALF TO WILLIAM R. TIMKEN AND HENRY H. TIMKEN, OF SAME PLACE.

ROLLER-BEARING.

SPECIFICATION forming part of Letters Patent No. 606,636, dated June 28, 1898.

Application filed February 19, 1898. Serial No. 670,987. (No model.)

*To all whom it may concern:*

Be it known that we, HENRY TIMKEN and REGINALD HEINZELMAN, citizens of the United States of America, and residents of the city of St. Louis, State of Missouri, have invented certain new and useful Improvements in Roller-Bearings for Vehicles, of which the following is a specification.

Our invention relates to roller-bearings, and has for its objects to minimize the friction, to facilitate the assembling of the parts and removal and manipulation of the same, and to improve the construction of the bearing.

To these ends our invention consists in the parts and arrangements of parts hereinafter described and claimed.

Figure 1:
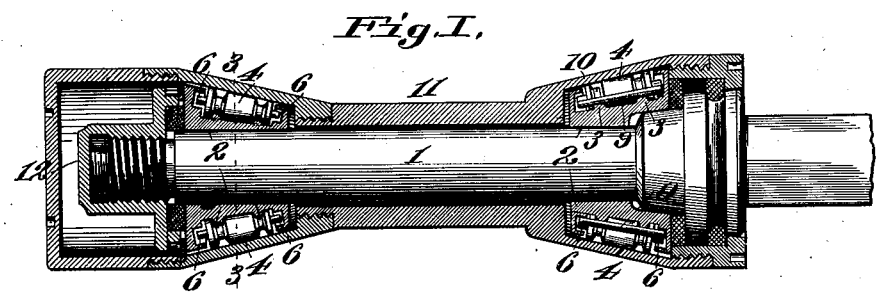
Figure 2:
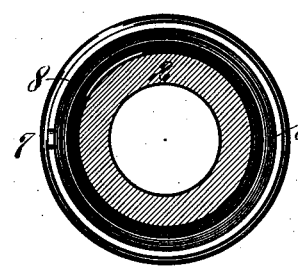
Figure 3:
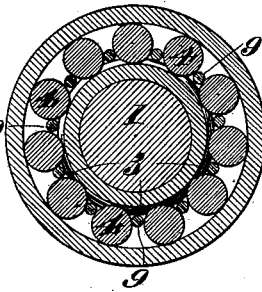
Figure 4:
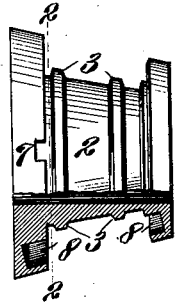
Figure 5:
Figure 6:

In the accompanying drawings, which form part of this specification, Figure 1 is a longitudinal sectional view of our bearing. Fig. 2 is a cross-section of the sleeve on the line 2 2 of Fig. 4. Fig. 3 is a cross-section of the bearing mounted on the axle on the line 3 3 of Fig. 1. Fig. 4 is a detail of the bearing-sleeve, showing a portion thereof in section. Fig. 5 is a detail of a horizontal roller, and Fig. 6 is a detail of the intermediate idle-rollers.

Near the end of the axle or spindle 1 and fitting thereon is a conical sleeve 2, which is provided with an annular rib or ribs 3 on its outer surface and which has its ends enlarged. Around this conical sleeve conical rollers 4 are provided, so as to bear thereon, and each roller is provided with a groove or grooves 5 to correspond with the rib or ribs on the sleeve, whereby the ribs lie in such grooves. The inner side or shoulder of the enlarged ends of the conical sleeve—that is, the side next to the bearing-surface—is hollowed out, so as to form an annular groove or space therein. The ends of the rollers 4 are abruptly reduced to a small projection 6, which when the rollers rest on the bearing-surface of the sleeve 2 does not touch any portion of the sleeve, but lies in the groove or space in the end thereof and under the overhanging annular portion of said end. When the enlarged ends are made integral with the sleeve, a notch 7 large enough to let the projection at the ends of the roller pass is formed in the overhanging portion for the purpose of assembling the parts.

In the groove or space at each end of the sleeve is a raised shoulder 8, constituting an annular bearing-surface, said shoulders extending farther beyond the main bearing-surface of the conical sleeve than the ribs 3 thereon, which coöperate with the grooves in the rollers. Between each two of the bearing-rollers 4 is a conical roller 9, whose ends extend beyond the bearing-rollers 4 and rest on the raised shoulders in the enlarged ends of the sleeve. The smaller rollers are thus entirely clear of the main bearing-surface of the sleeve and of the ribs thereon, and they are made sufficiently small to clear the outer box or casing 10 of the bearing, which box is embedded in the hub of the wheel. The notch in the overhanging portion of this enlarged end is made large enough to allow of the insertion of these small rollers.

The operation of the device is as follows: The hub of the wheel is furnished with a cylindrical sleeve 11, terminating at each end in a conical box 10, whose inner surface constitutes the outer bearing for the rollers 4 around the corresponding conical sleeves 2, it being understood that there is one conical sleeve at each end of the hub. The wheel is held on the axle by an ordinary carriage-nut 12, working on a thread on the end of the axle and arranged to adjust the conical bearing-sleeves. Suitable dust-caps and washers are provided, as described. The several bearing-rollers 4 are assembled upon the conical sleeve 2, with the projections at their ends inside of the grooves at the ends of the sleeve and their grooves straddling the ribs of the sleeves and with the smaller rollers arranged alternately with them. Endwise movement of either of the conical sleeves effects the adjustment of the bearings. When the wheel turns, the bearing-rollers 4 roll with it upon both bearing-surfaces. As the rollers 4 are in contact with the intermediate idle-rollers 9, said idle-rollers are turned in a direction the reverse of the direction of rotation of the bearing-rollers—that is, the contact-surfaces of the two rollers move in the same direction. Thus the entire friction of the bearing-rollers is due to rolling contact only, and the only sliding friction in the bearing is that due to the ends of the smaller rollers in contact with the end shoulders, which is very slight by reason of the small area of such contact-surfaces.

Other special advantages of the foregoing construction are the facility with which the parts can be assembled and kept together while being manipulated. In use the overhanging end portions tend to prevent the bearing-rollers from climbing up on the ribs of the sleeve. By making the diameter of the larger enlarged end of the conical sleeve nearly equal to the inner diameter of the corresponding portion of the box or casing said end serves as a dust-cap, with which a split ring or washer coöperates.

Divers modifications may be made in the construction hereinbefore described without departing from our invention. For instance, instead of having separate shoulders in the ends of the bearing-sleeve the idle-rollers may bear on the ribs of the sleeve. So, also, the smaller rollers may be formed with grooves similar to those of the larger rollers for the purpose of straddling the ribs and thus preventing endwise movement. Again, it is obvious that the reversely-turned ends of the sleeve may be made as a part of the box or casing or may be made in separate pieces. Evidently, also, instead of a removable sleeve the inner bearing-surface may be formed on the axle or journal itself.

While our invention is designed primarily for vehicles, it is capable of general use as an axle or journal bearing, and we do not wish to restrict ourselves to its use with vehicles. So, also, it is obvious that our invention may be applied to cylindrical rollers and bearing-surfaces.

What we claim is—

1. A bearing comprising an inner bearing-piece and an outer bearing-piece and rollers fitting between the bearing-surfaces thereof, one of said pieces having one or more annular ribs thereon and one of said pieces having reversely-turned parts at its ends constituting grooves at said ends, and said rollers having narrow projections at their ends adapted to enter said grooves, substantially as and for the purpose set forth.

2. A bearing comprising an inner bearing-piece and an outer bearing-piece and rollers between the same, one of said pieces having reversely-turned end portions fixed thereon or integral therewith constituting grooves, one of said end portions being notched and said rollers having projecting end portions in said grooves, substantially as and for the purpose set forth.

3. A bearing comprising a conical sleeve with a rib or ribs thereon and having its ends enlarged and provided with grooves in their inner sides, conical rollers bearing on said sleeve and having grooves corresponding with said ribs and having narrow projections at their ends extending into said side grooves, substantially as and for the purpose set forth.

4. A bearing comprising a conical sleeve having its ends enlarged and provided with annular grooves and a notch in the back-turned portion thereof, and conical rollers around said sleeve having projections at their ends within said grooves, substantially as and for the purpose set forth.

5. A bearing comprising a conical sleeve having its ends enlarged and provided with annular grooves therein, conical rollers around said sleeve having projections at their ends within said grooves, a box around said rollers, said sleeve having raised annular surfaces, and smaller conical rollers arranged alternately with the first-mentioned rollers and upon said raised surfaces and clear of the main bearing-surfaces of the box and the sleeve, substantially as and for the purpose set forth.

6. A bearing comprising a conical sleeve, a box, and grooved conical rollers between the same, said sleeve having an annular rib or ribs coöperating with the grooves of the rollers and having grooves formed at its ends for projections at the ends of said rollers, and having raised annular surfaces in said grooves, and smaller conical rollers bearing on said raised surfaces and arranged alternately with said first-mentioned rollers and clear of the box and the main bearing-surface of the sleeve substantially as and for the purpose set forth.

St. Louis, Missouri, February 10, 1898.

HENRY TIMKEN.
REGINALD HEINZELMAN.

Witnesses:
FRANK H. HASKINS,
JAMES A. CARR.